J. C. GRIÈRE.
PROCESS FOR THE MANUFACTURE OF DRY CRYSTALS OF SUGAR AND OTHER CRYSTALLINE SUBSTANCES.
APPLICATION FILED JAN. 5, 1916.
1,228,910.
Patented June 5, 1917.
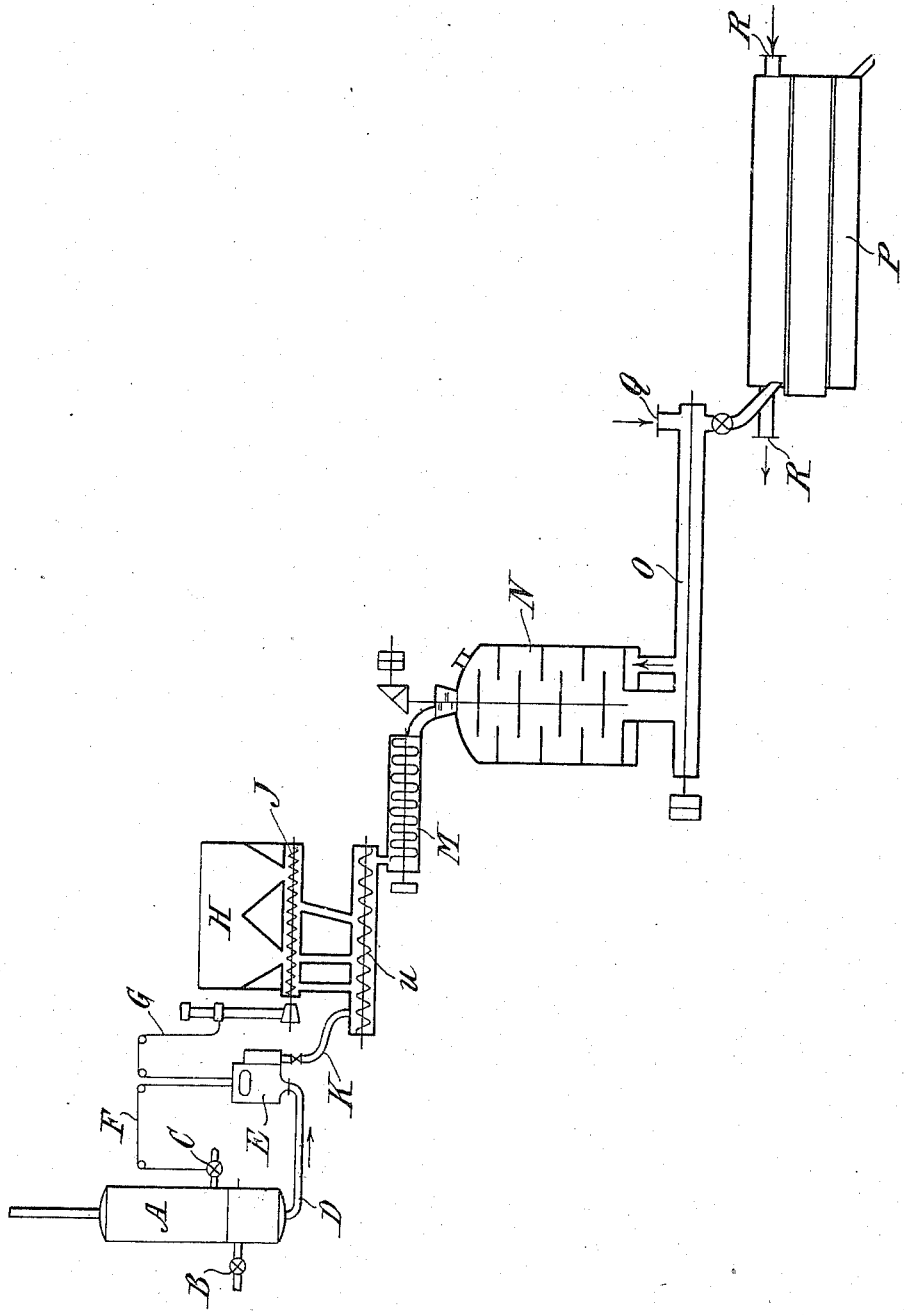
INVENTOR:
JEAN CHARLES GRIÈRE
BY: H. van Oldemeel
ATTORNEY.

UNITED STATES PATENT OFFICE.

JEAN CHARLES GRIÈRE, OF PADUA, ITALY.

PROCESS FOR THE MANUFACTURE OF DRY CRYSTALS OF SUGAR AND OTHER CRYSTALLINE SUBSTANCES.

1,228,910.  Specification of Letters Patent.  Patented June 5, 1917.

Original application filed May 28, 1914, Serial No. 841,466. Divided and this application filed January 5, 1916. Serial No. 70,441.

*To all whom it may concern:*

Be it known that I, JEAN CHARLES GRIÈRE, a citizen of the French Republic, residing in Padua, Italy, have invented certain new and useful Improvements in Processes for the Manufacture of Dry Crystals of Sugar and other Crystalline Substances, of which the following is a specification.

This invention relates to the direct conversion of a solution of sugar or of crystalline chemical substances of similar soluble properties into a dry and friable product without a residuary liquid, and to the process which consists in adding to a hot concentrated solution of the sugar or the like, a friable precipitating substance in such quantities as to bring about formation of a more or less hot paste.

This phenomenon is known *per se*, for instance if a certain quantity of fine sugar is added to a very hot concentrated solution of sugar and the mass stirred, all the dissolved sugar will be precipitated in the form of small crystals, and the mixture of precipitated sugar and the added sugar which brought about the precipitation, forms a kind of paste which is hot and more or less moist. The added substance may be the same as the substance in the solution or a foreign friable substance, for instance in the manufacture of raw sugar, there may be added to the hot concentrated syrup either sugar in grains or a foreign substance, such as kieselguhr (infusorial earth), sand, alumina, powdered bone black, etc.

The added substance absorbs water from the solution and acting in conjunction with the temperature of the large mass, an instantaneous crystallization is brought about, the little remaining moisture being distributed in the newly formed paste.

This action is described in the applicant's prior U. S. specification No. 988,261, the process of the present invention being a development of the process according to the said prior specification.

When the added substance is not the same as the substance under treatment, the former may remain in the finished product, as in the case of sugar products, such as denatured sugar (sugar not intended for human food) and mixtures in which the foreign substance is to be consumed with the sugar, or in the case of raw sugar prepared at a convenient site and intended for despatch to a refinery, where the separation is made when the sugar is remelted. The separation, however, does not form part of the present invention and any known method may be employed where necessary or desirable, for example, the methods referred to in German Patents 221,199 and 242,213.

An important feature of the present invention consists in treating a continuous supply of the hot concentrated solution with a supply of the friable precipitating substance which is regulated according to the concentration and the quantity of the solution supplied, whereby the two bodies are mixed in the proper proportions for the precipitation of the sugar, or the like and the formation thereof into a hot paste, and subjecting the hot paste to subsequent kneading and drying operations to reduce the paste to a dry granular product.

In carrying out the crystallization process according to the invention the formation of the hot paste is effected during two distinct stages of treatment which are the precipitation of the substance in a precipitating apparatus, and the homogeneous mixing of the mass in a kneader.

By thus dividing the production of hot paste into stages, it is possible to obtain at once throughout the whole mass a correct proportion between the added substance and the solution. While the solution flows into the precipitating device, the desired quantities of the substance to be added, for instance fine sugar, are added to it in a continuous and uniform manner, which operation is carried out by a separate distributing device which distributes the fine solid substance into the supply of solution. This avoids excessive cooling of portions of the mass by excessive quantities of the added substance, which would cause a formation of lumps, and insufficient cooling of other portions, which gives an insufficient precipitation. Moreover, the evolution of vapors during the precipitation is avoided as far as possible, which would mean an excessive cooling of the whole mass. For in order to insure the result desired, the whole inner heat should remain as much as possible in the mass, as the said heat plays an important part in the subsequent carrying out of the process and cannot be replaced by heat introduced from the outside.

The raw solution is concentrated in a concentrator which works at a constant pressure of heating steam, which is insured by means of a well known device with an automatically regulated valve, and the variations in the quantity of concentrated liquid discharge from the concentrator are utilized for regulating on the one hand, the quantity of unconcentrated liquid entering the concentrator, and on the other hand, the amount of material delivered from the distributing apparatus.

Precipitation of the substance in accordance with the method of working hereinbefore described takes place in a perfectly regular manner. In the said operation only a superficial mixture of the dry substance and of the liquid is produced when they come first into contact, and although precipitation takes place very quickly, it is only in the subsequent treatment in the kneading device that complete formation of the hot paste takes place. The kneading of the mass results in neutralizing and compensating small variations in the precipitation, and the mass is converted into a homogeneous paste.

The kneading device constitutes at the same time a reservoir between the precipitating device and the drying apparatus coming after it. During the kneading it is necessary to avoid as much as possible a cooling of the paste.

The conversion of hot paste into a dry and friable product by treatment with air, also takes place in two successive stages and in distinct apparatus, so as to be able to take into account for the treatment of the paste, its different consistencies during the course of its successive changes, and also the variable resistance which it offers to transport at different stages.

The paste escaping from the kneading device, forms a solid mass having the form of an almost continuous "sausage" which is difficult to transport horizontally by means of a rotary conveyer. Moreover, in this state the drying by means of air should be carried out only very slowly. Only a small quantity of air should be allowed to act on the mass, and it is advisable, in order to avoid irregular drying, to use a current of hot air already partly saturated with moisture.

When by means of this treatment a portion of the moisture and heat has been removed from the paste, the latter becomes easily broken up into more or less small balls from which finally a dry and fine product is obtained. For this second period a stronger and colder current of air is used, as at this stage of working, the moisture and the heat should be eliminated quickly.

It is preferable to carry out the transport of the paste during the first stage of drying on horizontal or inclined surfaces, in some cases allowing the paste to fall from time to time in cascades through the air.

On the contrary during the second stage of drying, at the beginning of which the mass has been already rendered partly friable and becomes broken up into small balls, it is given quicker movement and stirred more energetically, while air is forced to circulate violently through the mass. During this last stage of working, the mass is brought to a perfectly dry and cold state.

According to the fineness of the product to be obtained the drying treatment is made to last a longer or shorter time or the quantity and the temperature of the air is regulated, or colder air is made to act during the first stage of drying, and hot air during the last, a perfectly dry product or a more or less moist product, or even a still hot product, being obtained.

The action of hot air is very important for facilitating screening.

Moreover, in combination with the subsequent action of moist air, it forms one of the conditions for good preservation of the product.

Sugar or chemical substances prepared by this process of precipitation are generally very difficult to screen in the cold state, even when they have very little or no moisture at all. The cloth of the screen gets quickly choked by fine dusty crystals. If however the product is fairly hot, if its temperature is for instance 40–60°, it is very easy to screen it by means of ordinary screens, without it being ever necessary to clean the screens.

For this reason, the drying of the kneaded paste may be interrupted while the same is still hot, say at the end of the first stage of drying referred to, the product then sifted, and finally treated with cold air.

When hot air is used during the last stage of the drying the product comes out dry and still a little hot, from the apparatus. If necessary, it can be heated still more by means of hot air in a further apparatus, before screening.

If the product is packed and placed into warehouse in the dry state, and more particularly when still hot, it becomes agglomerated in the sacks and loses its market value.

This phenomenon is due to strong adhesion of completely dry crystals, which takes place when a thin layer of air and moisture does not surround each grain.

In the present process, the drawback in question is avoided by giving back to the screened product while cooling it, the moisture that corresponds to its natural hygroscopic moisture.

In short, according to this process, the product can be first of all prepared in a hotter and drier state than is necessary for sale, then screened, then cooled and again moistened, in other words, the finished product is given back a portion of the moisture that it had during its manufacture. This latter method has the double advantage that the work is rendered more convenient and moreover, that it is possible to regulate the final moisture at will according to the requirements with regard to preservation of the product.

The cooling and moistening of the manufactured product can be carried out by means of a cold current of air saturated with moisture. It is however also possible to use a very hot current of air containing more moisture than colder air can hold, by submitting simultaneously the hot air, and the product to be treated, in the interior of a cooling and moistening apparatus, to the action of a refrigerating surface. As saturated hot air, the moist air coming out from the dryer could be advantageously used.

A further feature of the invention comprises the addition of decomposable solid, liquid, or gaseous substances before or during the operation in which the friable product and more particularly sugar, is formed.

In this manner the composition, quality or nourishing value of the product or its taste or color can be varied. The agents added for this purpose are in addition to the substances intended to precipitate the product from the solution.

If these agents have to be introduced into the concentrated solution, the dissolved substance of which undergoes afterward, as already stated, an instantaneous crystallization owing to the action of a precipitating product, with formation of a more or less hot paste, the introduction of the materials to be added is also effected in a continuous manner, and in regulated quantities, into the concentrated solution during its escape from the concentrator or its admission into the precipitating device, or directly into the latter during the precipitation.

It is advisable to proceed with the introduction of the agents at the above mentioned stages, because it is easy to regulate the proportions, and to obtain a thorough mixture, with uniform progress of any reactions which may occur due to said agents during the precipitation of the material and the production of the hot paste, and because moreover the gases and the liquids readily disappear as such at the moment in question or during the subsequent drying of the paste.

The additions employed in this modification of the present process may be of various natures, such as food substances, fodders, denaturing agents, etc.

If it is desired for instance to give sugar a certain proportion of inverted sugar, a solution of inverted sugar of desired quantity is introduced simultaneously with the addition of the precipitating sugar into the precipitating device or rather into the concentrated solution.

As decolorizing agents could be used for instance gaseous or liquid sulfurous acid or hyposulfurous acid, or oxygenated products of sulfur such as "blankite"; redos, etc. The decolorizing agents more particularly, act much better on the paste during its formation or kneading, than on the sugar solution or on the final product itself, but these agents, might nevertheless be introduced during a period subsequent to the formation of the friable product.

The present process can also be applied for transforming a hot solution already containing crystals, for instance a cooked mass (massecuite) of sugar in grains, into a dry and friable product without "draining."

The method of proceeding is similar to that hereinbefore indicated.

To the hot and liquid massecuite is added the friable precipitating substance in a continuous manner in the precipitating device. Moist and hot paste is then formed, consisting of a mixture of large crystals previously formed in the solution, with small crystals which have been produced in the mother-syrup. This paste is then submitted to subsequent treatment in accordance with the process hereinbefore described. By suitably screening, the large crystals formed in the beginning can be separated from the fine product.

If instead of fine and friable crystals, it is desired to produce hard blocks of agglomerated small crystals, for instance, sugar, in the form of lumps, plates, tubes, etc., the hot and moist paste after kneading is compressed or molded by known apparatus, so as to give it the desired shape.

The drying of these blocks may be subsequently carried out in suitable devices, for instance in kilns, under the influence of either a current of air or a vacuum. In the present case, this offers special advantages, as the material to be dried is still hot, and the heat contained in the molded paste is generally sufficient for bringing about quick evaporation of the moisture of the product.

Moreover, owing to its energetic cooling during the drying operation, the material acquires a much stronger consistency than that obtained for instance in the process of pressing sugar in lumps in cold and moist state. Moreover, it is not necessary to use such strong compression as hitherto customary, the result being that the product is lighter and has a better appearance.

Paste for the production of molded articles, can also be obtained in the manner hereinbefore described, by precipitating the substance of a massecuite in grains. For the manufacture of "molded" sugar, if no friable products to be added are available, such as for instance ground waste of the product itself, etc., a portion of the paste is converted, in accordance with the present process, into a dry and friable product which is then introduced into the solution for bringing about the precipitation of the product.

The accompanying drawing illustrates diagrammatically a complete installation for carrying out the process.

In the further description of the process, sugar will be taken as example, but the process and the apparatus are equally applicable to the manufacture and drying of any other products whose properties of solubility are similar to those of sugar.

The raw solution is strongly concentrated in a concentrating apparatus A which is provided with an automatically adjustable steam admission pipe B, and into which the solution to be concentrated enters in a continuous manner through the regulating valve C and is discharged, likewise in a continuous manner, at D. The solution passes into a float chamber E within which it moves a float which controls by means of cords or levers F and G the valve C and a feeder screw J hereinafter described. From the float chamber E the solution passes through a pipe K into an apparatus $u$ provided with a stirring device, and into which is also delivered the substance to be added to the solution, termed the precipitating substance, which comes from the automatic distributer H. The regulation of the quantity of the solution and that of the precipitating substance is therefore effected by the float in the chamber E. $u$ is the precipitating apparatus whence the paste which has been formed passes into the kneader M, to be rendered completely homogeneous. From the kneader the paste which is to be converted into a dry and friable product, is conveyed to a preliminary drying apparatus N where it loses its pasty consistency and is converted into a semi-dry product which is more or less friable. This product is then treated in a final drying apparatus O, in which latter, as in the preliminary drying apparatus the paste is treated by air which enters at Q and generally moves in a direction opposite to that of the product.

Finally, in an apparatus P the product is cooled and if necessary may be moistened sufficiently to give it the normal proportion of hygroscopic moisture.

A full description of the various apparatus composing the installation, and of the way in which it is employed in the carrying out of the process, is given in my companion specification Serial No. 841,466.

What I claim as my invention and desire to secure by Letters Patent is:—

1. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant, and the solvent dispersed therethrough, takes place.

2. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant and the solvent dispersed therethrough, takes place, and kneading the paste while it is still hot.

3. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant, and the solvent dispersed therethrough, takes place, kneading the paste while it is still hot, subjecting the kneaded paste to moderate agitation in a current of warm air partly saturated with moisture, and exposing the thereby partly dried product to greater agitation in a current of cold air.

4. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant and the solvent dispersed therethrough, takes place, kneading the paste while it is still hot, subjecting the kneaded paste to moderate agitation in a current of warm air partly saturated with moisture, exposing the product to greater agitation in a current of cold air, interrupting the latter treatment when the product is dry but still warm, sifting the product, and continuing the cold air treatment until a thoroughly cooled granular product is obtained.

5. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant, and the solvent dispersed therethrough, takes place, kneading the paste while it is still hot, subjecting the kneaded paste to moderate agitation in a current of warm air partly saturated with moisture, exposing the thereby partly dried product to greater agitation in a current of cold air, treating the dried product with moist air to give it its natural amount of hygroscopic moisture, and simultaneously cooling the product.

6. A process for the crystallization of sugar and other dry soluble products of crystalline nature from a hot concentrated solution by the addition of a friable precipitant, consisting in continuously introducing the precipitant into a continuous stream of the raw solution, in such quantity that continuous precipitation of the dissolved substance with formation of a hot, moist paste composed of the precipitated substance, the precipitant, and the solvent dispersed therethrough, takes place, kneading the paste while it is still hot, adding at any stage of the process a substance which will vary the composition of the product in any desired way, subjecting the kneaded paste to moderate agitation in a current of warm air partly saturated with moisture, exposing the thereby partly dried product to greater agitation in a current of cold air, treating the dried product with moist air to give it its natural amount of hygroscopic moisture, and simultaneously cooling the product.

7. A process for the formation of sugar crystals from a hot, liquid massecuite, consisting in continuously introducing a friable precipitant into a continuous stream of the massecuite in such quantity that continuous precipitation of the dissolved substance with formation of a hot, moist paste composed of the precipitated substance, the precipitant, and the solvent dispersed therethrough, takes place.

8. A process for the formation of sugar crystals from a hot, liquid massecuite, consisting in continuously introducing a friable precipitant into a continuous stream of the massecuite in such quantity that continuous precipitation of the dissolved substance with formation of a hot, moist paste composed of the precipitated substance, the precipitant, and the solvent dispersed therethrough, takes place, and kneading the paste while it is still hot.

9. A process for the formation of sugar crystals from a hot, liquid massecuite, consisting in continuously introducing a friable precipitant into a continuous stream of the massecuite in such quantity that continuous precipitation of the dissolved substance with formation of a hot, moist paste composed of the precipitated substance, the precipitant and the solvent dispersed therethrough, takes place, kneading the paste while it is still hot, subjecting the kneaded paste to moderate agitation in a current of warm air partly saturated with moisture, and exposing the thereby partly dried product to greater agitation in a current of cold air.

10. A process for the formation of sugar crystals from a hot, liquid massecuite, consisting in continuously introducing a friable precipitant into a continuous stream of the massecuite in such quantity that continuous precipitation of the dissolved substance with formation of a hot, moist paste composed of the precipitated substance, the precipitant, and the solvent dispersed therethrough, takes place, kneading the paste while it is still hot, subjecting the kneaded paste to moderate agitation in a current of warm air partly saturated with moisture, exposing the thereby partly dried product to greater agitation in a current of cold air, treating the dried product with moist air to give it its natural amount of hydroscopic moisture, and simultaneously cooling the product.

11. A process for the crystallization of sugar and other dry substances of crystalline nature, which consists in concentrating a hot solution of the substance in an evaporator heated by steam at constant pressure, continuously delivering a hot concentrated solution from the evaporator to a precipitating apparatus, delivering to the latter apparatus a continuous supply of a friable precipitant, regulating by means of the flow of solution from the evaporator to the precipitating apparatus both the quantity of raw solution entering the evaporator and the quantity of precipitant entering the precipitating apparatus, increased discharge from the evaporator resulting in decreased supply of raw solution thereto and increased supply of precipitant to the precipitator, and vice versa, kneading the paste formed in the precipitator, and drying the kneaded paste in currents of air.

In testimony whereof I have signed my name to this specification in the presence of two subscribing witnesses.

JEAN CHARLES GRIÈRE.

Witnesses:
M. C. FREDY ———
YEANNI KOHLER.

Copies of this patent may be obtained for five cents each, by addressing the "Commissioner of Patents, Washington, D. C."